United States Patent [19]

Perry et al.

[11] Patent Number: 4,598,097

[45] Date of Patent: Jul. 1, 1986

[54] PIG FEEDSTUFF

[75] Inventors: Frederick G. Perry, Sudbury; John Fisher, Northwich, both of England

[73] Assignee: BP Nutrition (UK) Limited, Essex, England

[21] Appl. No.: 622,590

[22] Filed: Jun. 20, 1984

[30] Foreign Application Priority Data

Jul. 1, 1983 [GB] United Kingdom ............... 8317909

[51] Int. Cl.$^4$ .............................................. A61K 31/23
[52] U.S. Cl. .................................. 514/738; 426/2
[58] Field of Search .................. 426/2, 623, 630, 807, 426/658; 514/724, 738; 568/83

[56] References Cited

U.S. PATENT DOCUMENTS

| | | | |
|---|---|---|---|
| 3,723,130 | 3/1973 | Stephenson | 426/807 X |
| 3,852,473 | 12/1974 | Baile et al. | 514/724 |
| 3,895,117 | 7/1975 | Backlund | 426/807 X |
| 3,916,031 | 10/1975 | Beal | 426/807 X |
| 4,007,284 | 2/1977 | Goryaev et al. | 426/807 X |
| 4,186,212 | 1/1980 | Howell | 514/724 |
| 4,423,072 | 12/1983 | Stahly | 514/738 |

FOREIGN PATENT DOCUMENTS 3010250 9/1981 Fed. Rep. of Germany.

OTHER PUBLICATIONS

The Merck Index, Eighth Edition, pp. 971-972 (1968).
Nasi et al., "Polyol Mixture Supplementation as a Sweetner and/or Feed Additive in the Diet of Piglets", J. of Sci. Agri. Soc. of Finland (1981), vol. 53, pp. 57-63.
Nasi et al., "Polyol Mixture Supplementation in the Diet of Breeding Sows & Piglets", J. of the Sci. Agri. Soc. of Finland (1980), vol. 52, pp. 50-58.
Hawley, "The Condensed Chemical Dictionary", Van Nostrand Reinhold Co., 10th edition, pp. 960 & 978 (1982).

*Primary Examiner*—R. B. Penland
*Attorney, Agent, or Firm*—Morgan, Finnegan, Pine, Foley & Lee

[57] ABSTRACT

A feedstuff component for pigs contains one or more polyhydric alcohols in an amount to provide from 0.01 to 5% wt of polyhydric alcohol by weight of total feed. Preferred polyhydric alcohols are sugar alcohols, particuarly sorbital.

The invention includes a method of feeding pigs by including 0.01 to 5% wt of one or more polydrdric alcohols in their diet. The polyhydric alcohol improves the pig's growth rate, particuarly with high lipid diets, and acts primarily of male pigs.

1 Claim, No Drawings

PIG FEEDSTUFF

This invention relates to a feedstuff for pigs and to a method of feeding pigs.

According to the present invention a feedstuff component for pigs contains one or more polyhydric alcohols in an amount to provide from 0.01 to 5% of polyhydric alcohol by weight of total feed.

Perferred polyhydric alcohols are the so-called sugar alcohols which occur naturally in syrups isolated from trees, or which may be produced from sugars by reduction eg high pressure hydrogenation or electrolytic reduction. They may be hexahydric or pentahydric alcohols. Examples of suitable sugar alcohols are:
Sorbitol
Mannitol
Arabinitol
Xylitol
Galactitol Another source of sugar alcohols may be hydrogenated sugar syrups which may, in their turn, be produced by the enzymatic hydrolysis of starch. A suitable material of this type is that sold by Roquette Freres under the Registered Trade Mark "Lycasin" which contains D-sorbitol and hydrogenated di- and poly-saccharides.

A preferred range for the polyhydric alcohol may be from 0.01 to 1% wt.

The feedstuff component may be used for pigs of any age but is particularly suitable for piglets up to the age of 12 weeks. Thus, as discussed hereafter, it may be given to piglets from birth onwards, whether they are weaned or not.

For weaned pigs and piglets, the feedstuff component will normally be added to a solid, particulate, feedstuff which may be any of the known prestarter or starter feeds. Such feeds are sometimes known as creep feeds, since they may be dispensed as pellets from a so-called "creep feeder".

The components of the feedstuff, other than the polyhydric alcohol, may be the normal components for pig feedstuff and include sources of carbohydrate, protein, lipids (ie fats and oils) fibre, amino-acids, vitamins and minerals. While such basic components are generally similar to feedstuffs for other animals, the particular components and proportions have to be tailored to suit pigs and the term "feedstuff for pigs" would be understood as differentiating the feedstuff from feedstuff for other livestock.

With a solid particulate feedstuff the feedstuff component may be a feed supplement of the polyhydric alcohol on an organic or inorganic carrier eg biscuit meal of powdered limestone. It may be a premix of the polyhydric alcohol with one or more other feed components eg a polyhydric alcohol-vitamin and/or mineral premix or it may be a complete feed. Whatever the form the component may be admixed with other components at an appropriate stage in the feed manufacturing process and in the appropriate amount to ensure that the required amount of polyhydric alcohol is included in the pig diet.

The feedstuff may, however, be a liquid feedstuff, eg the polyhydric alcohol may be added to milk, milk replacer or water fed to pigs and piglets. The use of liquid feedstuffs containing a polyhydric alcohol may be particularly advantageous with non-weaned or partially-weaned piglets who are still on a liquid diet. Thus it has been proposed to give piglets additional milk from birth from special dispensers in the farrowing crate and it has also been proposed to wean piglets in pens containing dispensers for milk replacer liquids as well as dispensers for solid feed.

Without being bound by any theory, it is believed that the beneficial effect of the polyhydric alcohol results from the fact that it acts as an emulsifier for lipids and, thus, improves lipid digestibility. The use of polyhydric alcohols is particularly preferred with pig feeds of higher than normal lipid content, eg feeds with from 2.5 to 20% wt of lipid.

The invention includes a method of feeding pigs comprising including in the pig diet from 0.01 to 5% wt of one or more polyhydric alcohols by weight of total feed.

Other features of the feedstuff used may be as set out above.

The feeding pattern may follow standard practice. Thus, feeding will normally be ad lib with, for piglets, feeds being adjusted as the piglets grow. For example pre-starter and starter solid feeds may be used, with a change in feedstuff at an age of 4 to 7 weeks.

The beneficial effect of the polyhydric alcohol on pigs is to increase the growth rate and a particularly interesting feature of the present invention is that the polyhydric alcohol acts, primarily, to increase the growth rate of male pigs (either boars or castrates). With a litter or herd of containing both males and females there should still be a benefit in that the overall growth rate will be improved, but, in economic terms, the best results will be obtained if the males and females are separated and the feed containing the polyhydric alcohol fed to the males only.

The present invention, therefore, includes a method of feeding male pigs.

The invention is illustrated by the following comparative examples.

EXAMPLE 1

A pig creep feed was prepared from the following ingredients; maize wheat, oat groats, milk powders, soya meal, fats, minerals, trace elements, vitamins and amino acids.

0.3% sorbitol was added to half of the mix to create a test diet. The two resultant mixes were pelleted before feeding.

The overall composition of the pig creeps were:
Lipid content: 9%
Protein content: 24%
Fibre content: 1.5%
Energy (as total digestible nutrients): 90%
Lysine: 1.7%

These test diets were fed ad lib to young piglets, with the following results.

|  | Control | Test Diet |
|---|---|---|
| Number of pigs on test | 20 | 20 |
| Days on test | 19 | 19 |
| Age at weaning from sow (days) | 19 | 19 |
| Average weaning weight (kg) | 5.10 | 4.97 |
| Age at end of trial (days) | 39 | 39 |
| Average weight at end of trial (kg) | 10.02 | 10.50 |
| Average liveweight gain (kg) | 4.92 | 5.53 |
| Feed consumed/pig (kg) | 5.40 | 5.60 |
| Feed conversion rate | 1.10 | 1.01 |
| Daily liveweight gain (grms) | 259 | 291 |

Improvement in gain due to Sorbitol = 12.35%

EXAMPLE 2

Using the same procedure as in Example 1, the results were:

|  | Control | Test Diet |
|---|---|---|
| Number of pigs on test | 64 | 40 |
| Days on test | 18 | 20 |
| Average weaning age | 19 | 19.5 |
| Average weaning weight (kg) | 5.15 | 5.10 |
| Average age at end of trial (days) | 37.3 | 40 |
| Average weight at end of trial (kg) | 9.30 | 10.77 |
| Average liveweight gain (kg) | 4.15 | 5.67 |
| Feed consumed/pig (kg) | 4.44 | 5.65 |
| Feed conversion rate | 1.07 | 0.99 |
| Daily liveweight gain (grms) | 231 | 281 |

Improvement in gain due to Sorbitol = 22.5%

EXAMPLE 3

Three feeding trials on young pigs were carried out in a manner similar to Example 1, but with males and females separated. Thus the same number of males and females were separately fed a diet containing 5 kg/tonne (0.5% wt) of sorbitol and in control trials the same number of males and females were separately fed the same diet without sorbitol.

The results of the three trials were as follows.

Trial A

Total number of pigs 92 (46 boars, 46 females)
Trial period 20 to 35 days of age

| Daily Live weight gain (grms) | | | |
|---|---|---|---|
|  | Control | Sorbitol | % |
| Males | 209 | 268 | +28.2 |
| Females | 236 | 222 | −5.9 |

Trial B

Total number of pigs 48 (24 castrates/boars, 24 females)
Trial period 21 to 42 days of age

|  | Control | Sorbitol | % |
|---|---|---|---|
| Males | 371 | 416 | +12.1 |
| Females | 374 | 373 | −0.3 |

Trial C

Total number of pigs 571 (286 castrates, 285 females)
Trial period birth to 42 days of age

|  | Control | Sorbitol | % |
|---|---|---|---|
| Males | 196 | 219 | +11.7 |
| Females | 201 | 204 | +1.5 |

We claim:

1. A method of feeding male pigs to increase their growth rate consisting essentially of including in a nutritionally balanced pig feed from 0.01 to 1% wt sorbitol by weight of total feed wherein the feed also contains from about 2.5% to 20% lipid by weight of the total feed.

* * * * *